June 27, 1967 S. D. ROSENBAUM 3,328,601
DISTRIBUTED FIELD EFFECT DEVICES
Filed June 2, 1964 6 Sheets-Sheet 1
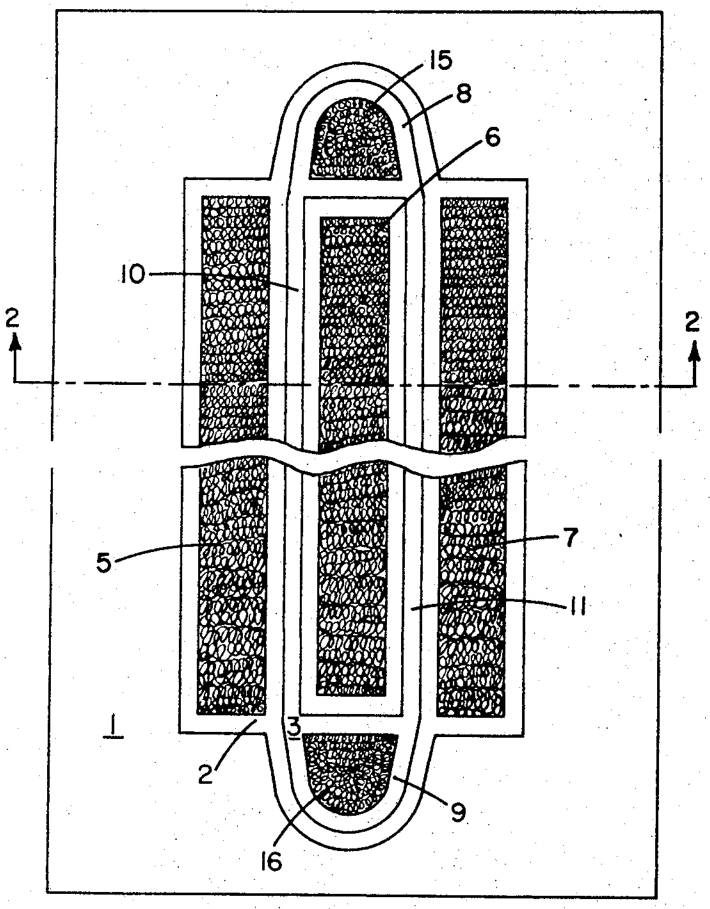
Fig. I
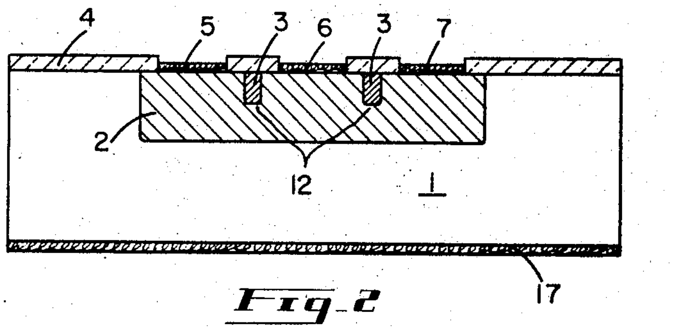
Fig. 2

June 27, 1967 S. D. ROSENBAUM 3,328,601

DISTRIBUTED FIELD EFFECT DEVICES

Filed June 2, 1964 6 Sheets-Sheet 3

June 27, 1967 S. D. ROSENBAUM 3,328,601

DISTRIBUTED FIELD EFFECT DEVICES

Filed June 2, 1964 6 Sheets-Sheet 4

June 27, 1967 S. D. ROSENBAUM 3,328,601

DISTRIBUTED FIELD EFFECT DEVICES

Filed June 2, 1964 6 Sheets-Sheet 5

United States Patent Office 3,328,601
Patented June 27, 1967

3,328,601
DISTRIBUTED FIELD EFFECT DEVICES

Stanley D. Rosenbaum, Ottawa, Ontario, Canada, assignor to Northern Electric Company Limited, Montreal, Quebec, Canada Filed June 2, 1964, Ser. No. 372,007
Claims priority, application Canada, Apr. 6, 1964, 899,624
15 Claims. (Cl. 307—88.5)

This invention relates to apparatus for controlling the dynamic range of an electric signal in which its amplitude may be increased or attenuated. In one type of apparatus the signal may be increased above its initial value and decreased below it. In a second type attenuation only is contemplated.

The control of the amplitude change in signal between input and output of a device generally falls into three categories, the first in which the input signal covers a wider dynamic range than the output, secondly where the output must cover a wider range than the input, and thirdly where the output may be of wider or narrower range than the input. In the first category are devices such as those for signal limiting and compressing (for example, automatic gain control in telephone and radio systems). In the second category are expanders (such as contrast expanders, for example for extended amplitude range reproduction from recordings). In the third are signal mixers and faders (for example for audio, telephone, or television work). The control in all of these cases may be either manual or automatic. In the case of compressors and expanders the control is related to the amplitude of the input signal, while in the case of faders the control follows a predetermined program.

In variable gain circuits there are always the associated problems of distortion, noise (when small amplitudes are used to reduce distortion) and drift of grain with time. While in constant gain systems negative feedback can overcome the problems of distortion and drift, this procedure effectively cancels any gain variations in the amplifier and cannot, perforce, be used where the intent is that the gain must change.

In the past variable gain systems have generally employed a remote cut off vacuum tube whose desired characteristic of gently and continuously changing slope of anode current against grid bias curve is obtained by winding the control grid as a varying pitch helix. Vacuum tubes are in general not compatible with solid state circuits but to date such solid state devices as might be considered as variable gain devices have produced unsatisfactorily large distortion.

It is one of the objects of the invention to meet the shortcomings of the present state of the art by providing a solid state device which in one form can achieve both amplification and attenuation of an input signal (the active mode) under variable gain conditions with a considerably lower distortion than has hitherto been possible. In a second form of the device low distortion with variable attenuation (the passive mode) can be achieved.

More specifically in accordance with the invention there is provided apparatus for the amplitude control of electrical signals which comprises a semi-conductor body, a source and a drain formed in said body and including a conducting channel for current flow between the source and drain, extending in a direction transverse to the current flow, field effect gating means for controlling the conductivity of said channel, and means for applying variable bias between said chanel and said gating means for varying the conductivity of said channel in the direction of its breadth transverse to the direction of said current flow.

In a preferred form of the invention the gating means is of extended breadth in a direction transverse to the direction of the current flow in the channel. The source and gating means may in some instances be electrically resistive and permit potential dividing action along them. The gating means may include at least one part which is either of semiconducting material or which is insulated from the channel material by an insulating layer.

Other and further objects and features of the invention will become apparent from the description which follows.

The invention will now be described with reference to the accompanying drawings in which:

FIGURE 1 shows a plan view of a device for operation in the active mode,

FIGURE 2 shows a side view in section along the line 2—2 of FIGURE 1,

Figure 3:
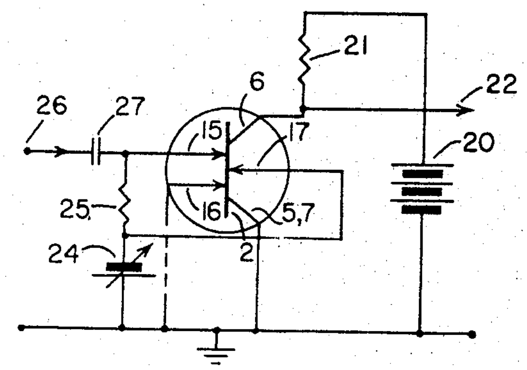
Figure 11:
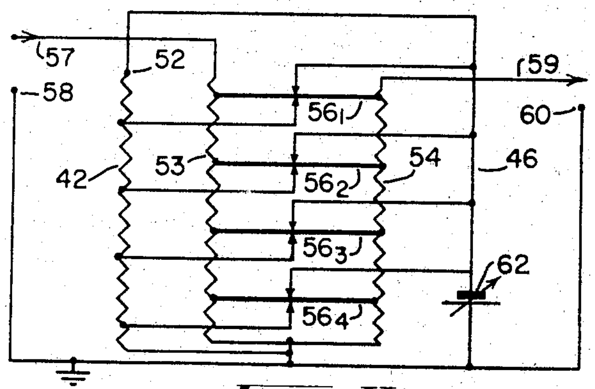
Figure 12:
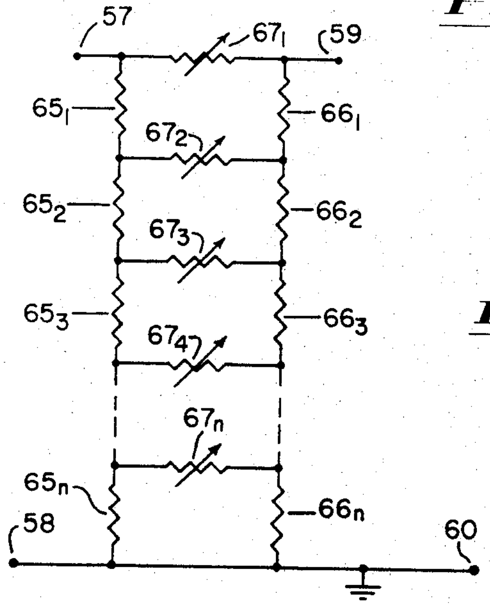
Figure 4:
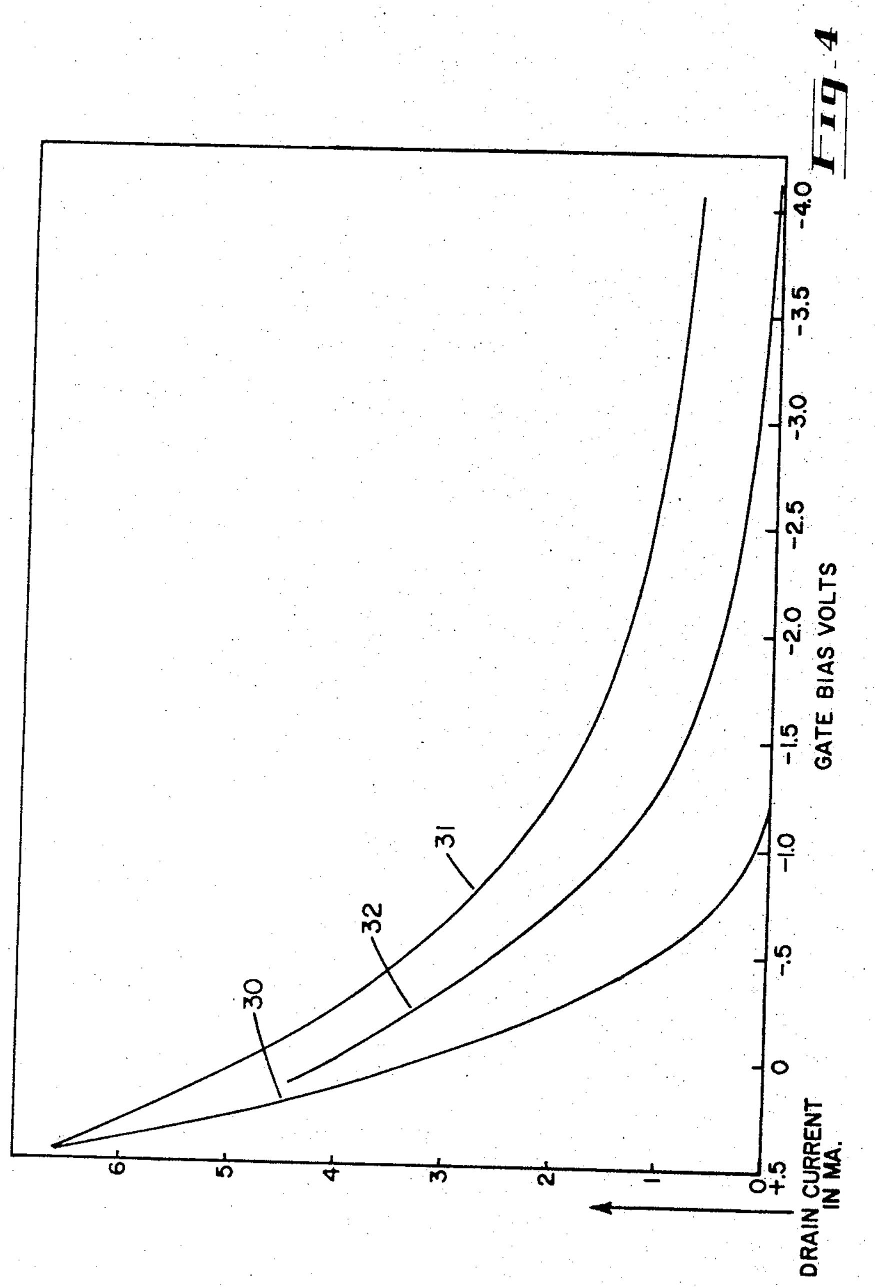
Figure 5:
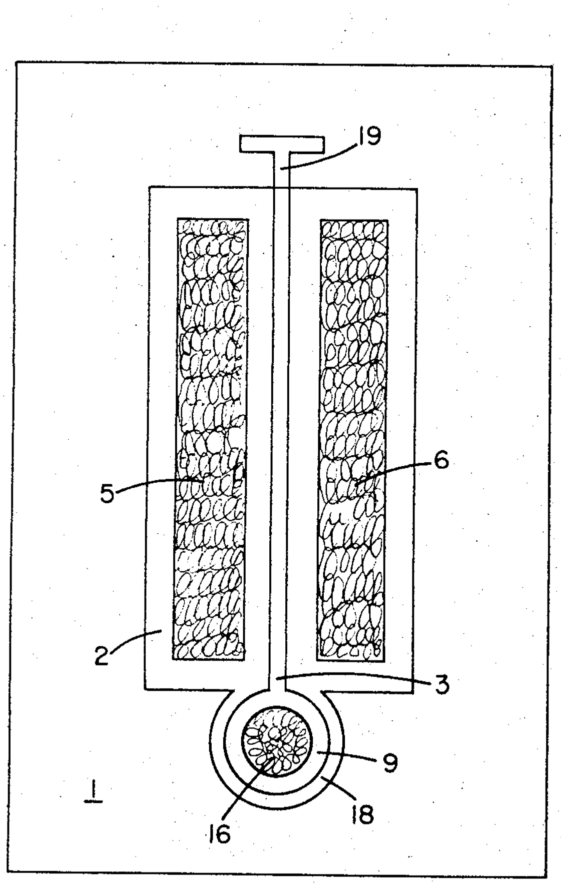
Figures 6, 7, 8:
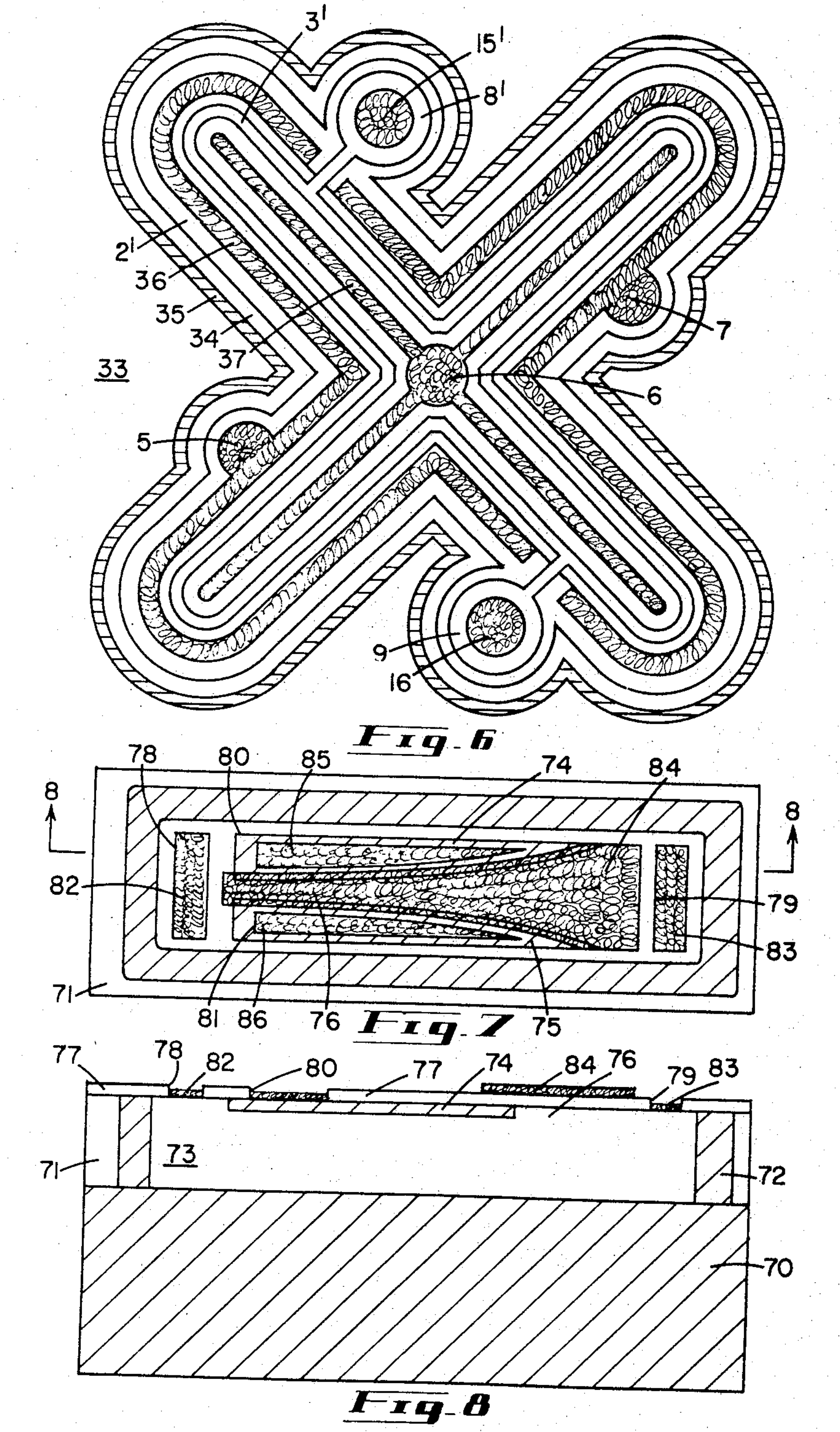
Figure 9:
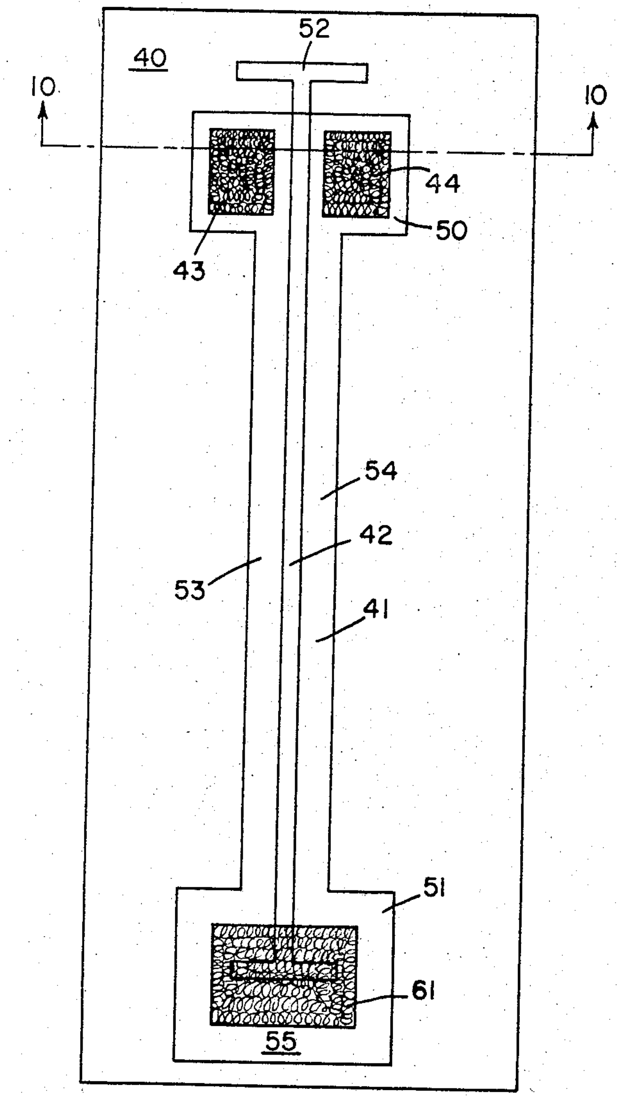
Figure 10:
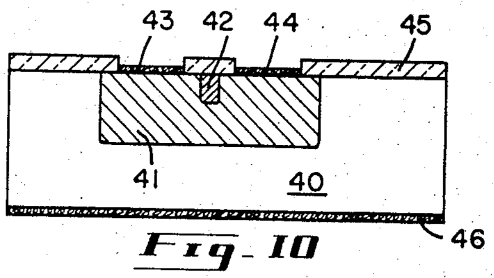

FIGURE 3 shows a schematic circuit diagram for the device of FIGURES 1 and 2 with associated components, FIGURE 4 shows a curve of drain current against gate bias volts for the circuit of FIGURE 3, FIGURE 5 shows a plan view of a device similar to that of FIGURES 1 and 2 but with a non-looped upper gate, FIGURE 6 shows a plan view of a preferred form of the device of FIGURES 1 and 2, FIGURE 7 shows a plan view of an insulated gate field effect device with provision for applying distributed bias along the lower gate, FIGURE 8 shows a side view of a section along the line 8—8 of FIGURE 7, FIGURE 9 shows a plan view of a solid state field effect device for operation in the passive mode, FIGURE 10 shows a section along line 10—10 of FIGURE 9, FIGURE 11 shows a schematic circuit diagram including the device of FIGURES 9 and 10, and FIGURE 12 shows a schematic representation of the operation of the device of FIGURES 9 and 10.

Referring first to FIGURES 1 and 2 the field effect device comprises a substrate 1 of a first conductivity type into which a region 2 of the opposite conductivity type is diffused using oxide masking technique as in fabricating planar transistors. In to a region which is within region 2, again using oxide masking, is diffused a doping material of the first conductivity type to form the upper gate 3. A silicon oxide layer 4 is formed on the surface of the device and is punctured by etching (see FIGURE 2) to allow deposition of metallic contacts 5, 6 and 7 (such as by evaporation or electrolytically) onto the material of region 2. As can be seen in FIGURES 1 and 2 the gate diffusion 3 forms two narrow strips in regions 10 and 11 but broadens out to form larger areas at 8 and 9 connecting the two strips. In these areas metallic contacts 15 and 16 are respectively deposited onto the material of gate 3. The underside of substrate 1 also has a metallic contact layer 17 deposited upon it to form a lower gtae.

The structure just described thus somewhat resembles well known field effect transistors but the configuration of the elements is novel especially the provision of two contacts to the upper gate 3 and the length of the gate 3 is somewhat greater than average.

Having reference now to FIGURE 3 let us assume for the sake of argument that the substrate is of p-type conductivity, that region 2 is of n-type and gate 3 of p-type. The device is now connected so that current can pass through the region 2 from source contacts 5 and 7 through the channels 12 to drain contact 6. Contacts 15 and 16 form upper and 17 the lower gates respectively. Battery 20 passes current through the region 2, and load resistor 21 enables a voltage output with respect to ground to be derived at 22. Variable control bias can be applied to electrode 15 as depicted by battery 24 feeding through resistor 25. If punch through from lower gate 17 to upper gate 16 is a problem when a high inverse bias is applied, gate 17 may be connected through a suitable value bias battery to ground so that the gradient between the two gates is reduced. In practice if the substrate 1 is of high resistivity material for instance about 100Ω cm. no trouble from punch through is normally experienced providing the lower gate 17 is biased by connecting it to the junction between the battery 24 and resistor 25. The signal applied between input 26 and ground is fed through a condenser 27 to electrode 15.

Let us now examine the curves of FIGURE 4 showing the operation of a specific prototype device, and assume that initially electrode 16 is left disconnected.

The device now behaves as a typical known field effect transistor producing the curve 30. At low and forward values of bias on gate 15 (battery 24 is shown in FIGURE 3 in the position to give inverse bias) the drain current varies almost linearly with small changes of gate voltage. When however the bias is increased in the inverse direction, as necessitated when the gain is to be reduced, the response becomes more and more distorted producing smaller changes in output across load 21 for excursions of gate voltage in the inverse direction than for those in the forward direction. At a gate bias voltage of about 1.2, conduction through the base region 2 ceases.

If however electrode 16 is now connected to source potential (i.e. to ground) the curve obtained is that of 31. This is a much more desirable curve with a gently changing slope from the value at extreme forward bias out to some very high value of inverse gate bias. In this connection the bias applied to electrode 15 causes a current flow along the gate material 3 from electrode 15 to electrode 16. Since material 3 has resistance, typically about 10–20KΩ, the bias voltage at any section along the device therefore varies from a maximum at 15 to zero at 16. The gate thus provides a potential dividing action.

There is one undesirable feature in connecting the electrode 16 directly to ground in that, at least over the operative range, it is not possible to cut off current flow through the channel completely. Suppose now that electrode 16 is connected through a resistor to ground. By suitable choice of value for this resistor, curve 32 can be derived which not only shows a gentle change in slope, but also enables the device to be completely cut off at a practically suitable gate voltage. In this connection and referring to FIGURE 1 and FIGURE 4, when the bias reaches the initial value for cut-off at about 1.2 volts the upper end of gate 3 adjacent 15 starts to lock current flow from source to drain. As the bias is increased the section at which conduction ceases moves down the device until for a chosen value of resistor between 16 and ground at about 4.5 volts bias (on curve 32) conduction along the whole breadth of the channel 12 is blocked. The device can now be fully cut off if desired, and the bias can be varied over a wide range with comparatively little distortion at the high input amplitudes. It should be noted that the potential dividing action of the gate on the input signal is linear (since its resistance for all practical purposes is constant) and is responsible for avoiding the introduction of distortion since the portion of the gate carrying the large signal amplitude is biased to cut off that part of the channel to which it is adjacent.

It can be shown by considering curve 31 (produced by a practically constructed device) in the extreme case of a compressor having constant output, a dynamic range of 60 db to 70 db of input can be accommodated with no greater second and third harmonic distortion than is obtainable using prior art devices without distributed bias for a dynamic range of 30 db. The curve 32 shows that a solid state device can be constructed which has similar characteristics to the remote cut off variable $\mu$ vacuum tube. Although the device of FIGURES 1 and 2 has a gate in the form of a closed loop in order to separate the drain from the source except as allowed by conduction through the channel, it is possible to construct a device having a non-looped gate as shown in FIGURE 5, in which the numbered regions correspond in function to those similarly numbered in FIGURES 1 and 2. In the device of FIGURE 5 the separation of source and drain as defined above is not complete, because the source and drain regions are electrically connected by region 18 surrounding the gate contact region 9. For many applications this interconnection is not a disadvantage, since any resulting current flow will not be modulated by the input signal. It may be seen that gate region 3 extends across to the undiffused region of substrate 1 at the extremity 19 remote from contact region 9, thus establishing electrical connection between regions 1 and 3 because these are of the same conductivity type. This automatically yields a preferred optional feature in which the lower gate and the upper gate are biased by the same battery. It will be seen that this extension of gate 3 onto region 1 prevents any unwanted interconnection between source and drain at the end 19 of gate 3. The generally elongated arrangement of FIGURE 1 might also be formed into a star shape to save space, as FIGURE 6 shows.

This device resembles that of FIGURES 1 and 2 in construction, having first and second diffused regions 2′ and 3′ corresponding to 2 and 3 respectively in FIGURE 1. In addition, if desired, it has a guard ring 35, formed simultaneously with region 3′. Reference to Canadian Patent 667,423 issued July 23, 1963, in the name of Alberto Loro and granted to Northern Electric Company Limited of Montreal, Canada, discloses the way in which such guard rings can be formed and how they inhibit surface leakage by preventing local inversion of conductivity type in the surface. The gate 3′ defines a channel through the base 2′ and is carried out to contact areas 8′ and 9′. Metal contacts 36, 37, 15′ and 16′ are deposited to allow connections 5′ and 7′ to the source, 6′ to the drain, and to the gate respectively. It can be seen that by adopting this star shaped pattern analagous electrical performance to the device of FIGURES 1 and 2 can be achieved with a very considerable saving in occupied length.

Various other configurations will suggest themselves to those skilled in the art, for instance by employing deep diffusion isolation on an epitaxially deposited layer of silicon on a substrate of opposite conductivity type the island formed is insulated from the substrate, and it then can act as the lower gate for a channel and upper gate formed in the island. By making the island elongated and providing contacts at each end distributed bias can be applied along it.

This arrangement has particular advantages if an insulated gate field effect transistor is constructed (although it is not limited to such a device) since the absence of punch-through facilitates independent biasing of the gates. The upper gate may be tapered in width, and since the lower gate can be of uniform resistivity per unit length, by applying the bias along the lower gate but maintaining the upper gate at a constant potential, the channel may be cut off progressively from one end to the other in an exactly analogous manner to the effect produced by the variable pitch helical winding of the grid of a remote cut off variable $\mu$ vacuum tube.

An example of such a device is shown in FIGURES 7 and 8. This device comprises a substrate 70 upon which is grown an epitaxial surface layer 71 of opposite conductivity type to the substrate. An island is formed in the layer 71 by deep diffusion of an isolating ring 72 of the same conductivity type as the substrate to form a lower gate portion 73. Source and drain regions are diffused into the island to form suitably shaped source and drain 74 and 75 of the opposite conductivity type to the island and to yield a tapered space 76 between them. An oxide layer 77 is then grown on the surface of the specimen and is punctured at 78, 79, 80 and 81 and contacts 82, 83, 84, 85 and 86 are formed at each end of the lower gate, to produce the upper gate, and to connect to the source and drain respectively. It can now be seen that a distributed bias can be applied between electrodes 82 and 83 along the lower gate which, because it is isolated by diffusion ring 72 and because the depth of diffusion of the source and drain regions is shallow, is of uniform resistivity. A uniform potential is applied to the upper gate 84, and a conducting channel is thereby induced in the space 76. By varying the contour of the edges of source 74 and drain 75 and the shape of the electrode 84, a wide variety of characteristic curves of channel current against bias applied to one end of the lower gate 73 are possible.

FIGURES 9 and 10 show a low distortion device for operation in the passive mode. In order to reduce distortion this again makes use of a system of distributed bias, but in the passive mode the input signal is applied between source and ground rather than to a gate control electrode. If use is to be made of the potential dividing action for large signals then the signal must be distributed along the source region. As will be shown, a distributed signal will then also exist along that portion of the drain whose adjacent channel remains conducting.

The distributed bias for the device may be applied either along the source or drain regions, along the upper or lower gate or to combinations of any of these. It is clear that this gives a wide variety of possible arrangements. For example by restricting distributed bias potentials to source and drain both upper and lower gates may be maintained at the same potential and there is no danger of punch through from upper to lower gate. On the other hand if the bias is restricted to the upper gate, the source and drain regions can be at D.C. ground potential, which results in the lowest noise figure.

The device in FIGURES 9 and 10 is shown by way of example. The substrate 40 has diffused into it a base 41 of opposite conductivity type and a gate 42 is formed by diffusing a doping material of the first conductivity type into the base 41. Source and drain connections 43 and 44 are made to the base material. There is an oxide insulating skin 45 and a lower gate contact 46 made to the substrate 40. Typical oxide masking techniques are used in fabrication.

In FIGURE 9 in plan view it can be seen that the base 41 is formed as an elongated trench section with enlarged ends 50 and 51. The gate 42 is diffused along the length of the trench, one end being in region 51, and the other passing beyond region 50 and terminating at 52 in the substrate material 40. Since gate 42 and substrate 40 are of the same conductivity type, ohmic connection is established at 52 between gate and substrate. The source side 53 and drain 54 of the trench connect with each other through area 55 by virtue of the termination of the gate 42 in region 51, additionally a metallic contact is deposited on base 41 and on gate 42 in the region 51 so as to make ohmic connection between these two.

Schematically the device of FIGURES 9 and 10 may be represented as shown in FIGURE 11, where it is connected in an operative circuit. The source portion 53 is an elongated resistive element consecutively feeding channel parts $56_1$, $56_2$, . . . $56_n$ which are in turn connected to an elongated resistive drain section 54. Input is provided between wire 57 and ground at terminal 58, and output is obtained between wire 59 and grounded terminal 60. Variable bias as represented by battery 62 is provided between ground and lower gate terminal 46 on the substrate and onto the upper end of gate 42 by virtue of its connection at 52 to the substrate 40 (see also FIGURE 9). Metallic contact 61 joining gate 42, source 53, and drain 54 in the region 51 is connected to ground thereby tying down both the lower end of gate 42 and the lower end of the source and drain regions.

Electrically the device of FIGURES 9 and 10 may also be represented as shown in FIGURE 12 where the source region 53 comprises a series of resistors $65_1$, $65_2$ . . . $65_n$ connected to input wire 57 at the upper end and to ground at the lower end. The gate 52 provides variable conductive connection as shown by resistors $67_1$, $67_2$ . . . $67_n$ between source and drain regions. The conductance of resistors 67 is varied by the bias applied to gate 42.

In operation the bias is distributed along the upper gate 42 by applying the control potential to electrode 46. The lower end of gate 42 is grounded so that the actual gate potential at any section depends upon the distance of that section of gate 42 considered, from the upper end 52. With increasing applied control potential the conducting channel is cut off progressively starting from the upper end adjacent electrodes 43 and 44. An important point is that when large input signals are applied the upper channel part will be essentially cut off and the corresponding portions of source and drain will behave as linear potential dividers free from distortion. That portion of the signal which is fed through the lower part of the channel which is still conducting will be of lower amplitude than the input, and it is only in the feed through signal that such residual distortion as there is will be generated. The distortion is a small percentage of the total input signal.

It will be appreciated that in the structure shown in FIGURES 9 to 12 the conducting channel adjacent area 55 will theoretically never be completely cut off no matter how high the applied control potential may become because of the potential dividing action along the gate 42. There may also be punch through from the lower to upper gate in this area. If complete cut off at a definite control voltage is desired contact 61 may be made to connect only to source and drain regions in area 55 and a second contact can be made to the lower end of gate 42. The lower end of gate 42 can then be connected to ground through a suitable value resistance.

Although in the descriptions of FIGURES 1, 2, 5, 6, 9 and 10 the devices have been shown with diffused channels, the upper gate may, especially, if punch through is a problem in any particular instance be formed as in FIGURES 7 and 8 as an electrode insulated from the surface of the base material in which it can induce a surface inversion channel. In this instance the material of which the upper gate electrode is made should have a definite calculable resistance per unit length if the distributed bias is to be applied along the upper gate electrode. Distributed bias might be applied along the lower gate, in a similar manner to that of FIGURES 7 and 8 by constructing the devices from epitaxially deposited material for instance.

Thus as can be appreciated from the foregoing descriptions, there are many ways of utilizing the principle of distributed signal and bias in variable gain structures. Classification can be into the two modes:

(1) Active Mode (2) Passive Mode

Structures may also be classified according to the way in which distributed bias is applied, namely;

(1) along upper gate only,
(2) along lower gate only,
(3) along base (source, drain, and channel), plus combinations of these. In addition to this it is quite feasible to design any of these structures to have a surface inversion channel rather than a diffused channel. Each of these structures may take a wide variety of geometrical shapes.

I claim:

1. Apparatus for the amplitude control of electrical signals which comprises a semiconductor body including source element means and drain element means and further including conducting channel means for current flow between the source and drain, at least one field effect gating element means for controlling the conductivity of said conducting channel means, the conductivity being dependent upon the potential difference between the gating element means and the conducting channel means, the greatest dimension of said source, drain and gating element means extending primarily in a direction transverse to the current flow, and means for varying the conductivity of said conducting channel means in the direction of its breadth transverse to the direction of said current flow, said last mentioned means comprising a pair of spaced-apart electrical contacts formed on one of said source, drain or gating element means and being spaced-apart in a direction transverse to the current flow, said one element means having the contacts formed thereon being electrically resistive in nature and said source element means is electrically resistive.

2. Apparatus as defined in claim 1 wherein said contacts are formed on said source element means.

3. Apparatus as defined in claim 1, including means for applying an electrical signal between a pair of contacts on said source element means, said pair of contacts being spaced apart in a direction transverse to the direction of current flow, said source element means and said drain element means being electrically resistive, and a pair of contacts connected to said drain element means, said pair of contacts being spaced apart in a direction transverse to the direction of curent flow for obtaining an output signal.

4. Apparatus as defined in claim 1, said conducting channel means comprising semi-conductive material of a first conductivity type, and said gating element means comprising an upper and a lower gate of semi-conductive material of opposite conductivity type.

5. Apparatus as defined in claim 1 the gating element means comprising an upper and a lower gate, the upper gate comprising a metallic conducting region and an electrically insulating layer between said metallic conducting region and said channel means, and the lower gate comprising semi-conductive material.

6. A solid state device as defined in claim 1, said contacts being on said gating element means and further comprising means connecting said source element means and a first one of said contacts, means feeding an input electrical signal to the other contacts, means for connecting said source elements means and drain element means to a voltage source, and means responsive to current variation through said voltage source for deriving an output in response to said input signal.

7. Apparatus as defined in claim 6 comprising resistive means connecting said first contact to said source element means, said voltage source being connected between said other contact and said drain element means.

8. Apparatus as defined in claim 6 comprising means uniting said source element means and said drain element means as a continuous physical structure at one edge of said conducting channel means, means connecting the first contact to said joined source and drain at the edge, and means for applying a control voltage to the other contact.

9. Apparatus as defined in claim 8 comprising means feeding input between said edge end of said source element means and its opposite end, and connecting means for obtaining output between said edge and the opposite end of said drain element means.

10. Apparatus as defined in claim 4, said contacts being on said upper gate.

11. Apparatus as defined in claim 10, one of said contacts being electrically connected to said lower gate.

12. Apparatus as defined in claim 5, said contacts being on said lower gate.

13. Apparatus as defined in claim 12, said upper gate being tapered in the direction of its breadth transverse to said current flow.

14. Apparatus as defined in claim 6, said gating means comprising an upper and a lower gate, said contacts being on said upper gate, means connecting the first of said contacts and said lower gate and means connecting the second of said contacts and said source element means.

15. Apparatus as defined in claim 1 wherein a current source is connected between said contacts for providing a distributed bias potential which varies with distance between said contacts, and the potential of one of said contacts is established at a chosen value with respect to the potential of the remaining drain, source or gate element means on which the contacts were not formed.

References Cited

UNITED STATES PATENTS

| | | | |
|---|---|---|---|
| 2,951,191 | 8/1960 | Herzog | 317—235 |
| 3,102,230 | 8/1963 | Kahng | 323—94 |
| 3,165,430 | 1/1965 | Hugle | 148—187 |
| 3,206,670 | 9/1965 | Atalla | 323—93 |
| 3,213,299 | 10/1965 | Rogers | 307—88.5 |

FOREIGN PATENTS

| | | |
|---|---|---|
| 1,349,963 | 12/1963 | France. |
| 921,947 | 3/1963 | Great Britain. |

OTHER REFERENCES

Amelco Semiconductor, Field Effect Transistors, theory and application notes, No. L, June 1963, 8 pages.

JOHN W. HUCKERT, *Primary Examiner.*

J. SHEWMAKER, *Assistant Examiner.*